April 2, 1929.  D. H. DAVIS  1,707,513
FIFTH WHEEL TRAILER
Original Filed Feb. 20, 1926    4 Sheets-Sheet 1
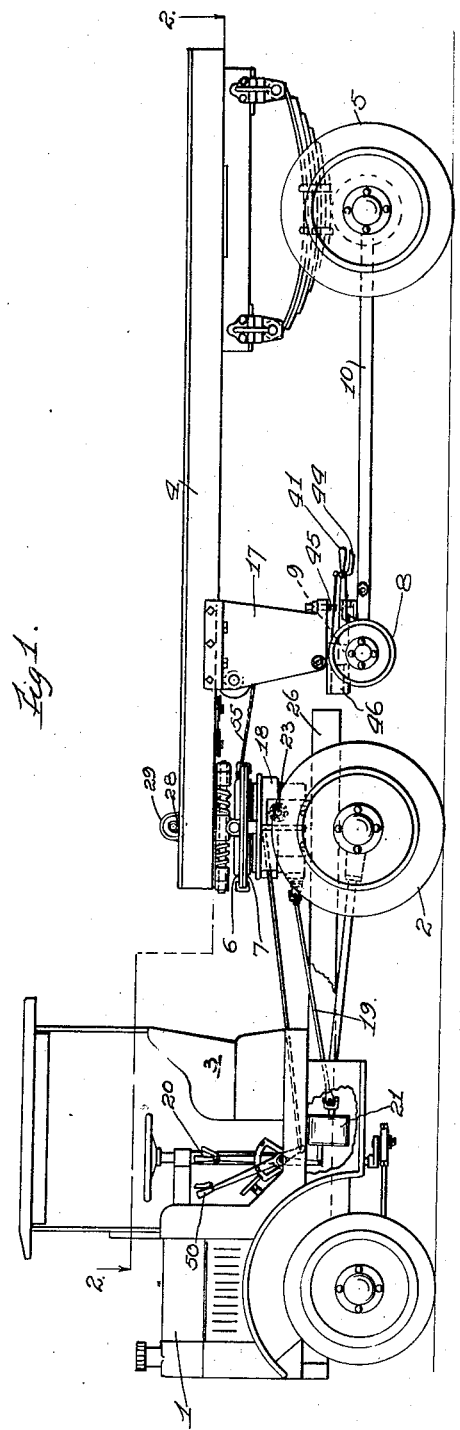
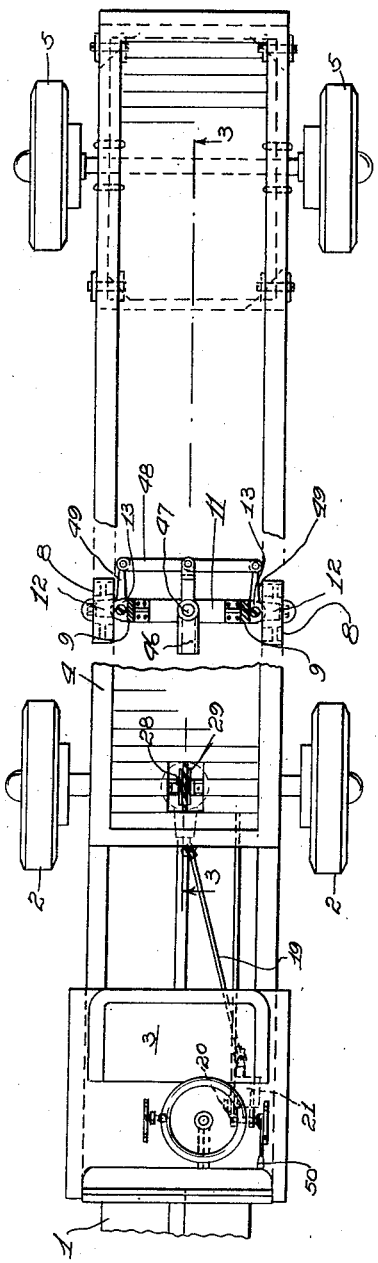
Inventor.
Durrel H Davis.
by his Attorneys.

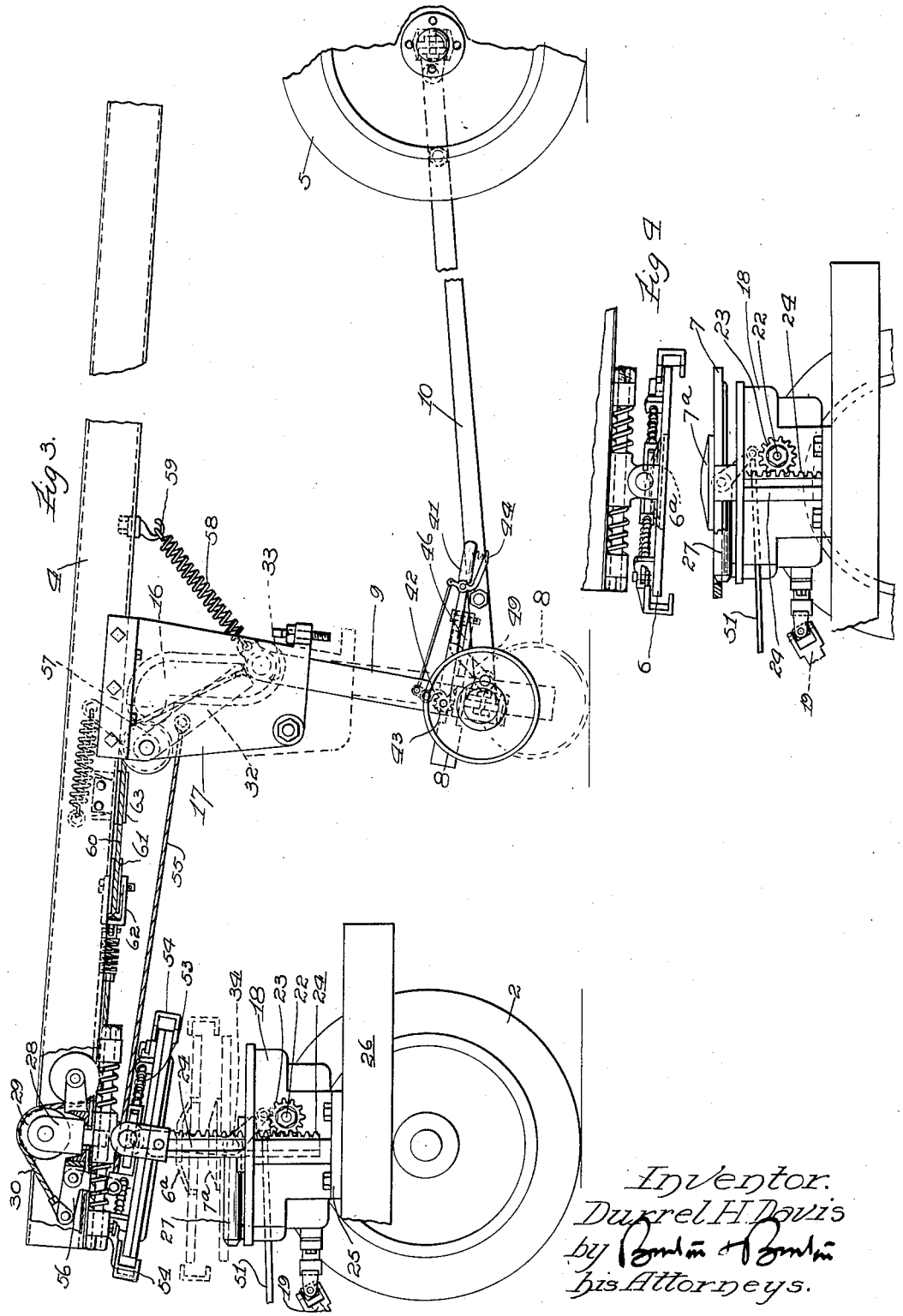

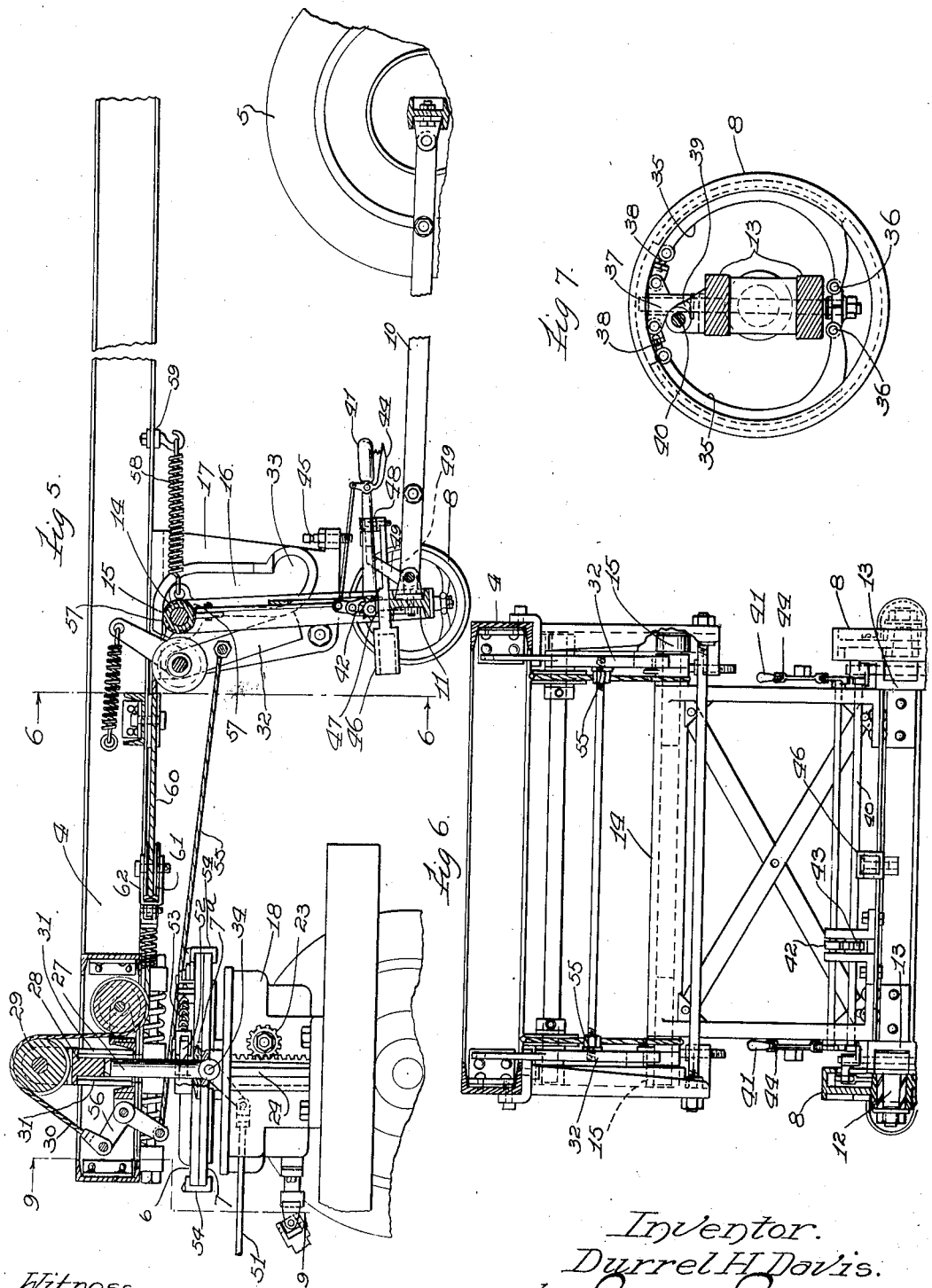

April 2, 1929.     D. H. DAVIS     1,707,513
FIFTH WHEEL TRAILER
Original Filed Feb. 20, 1926     4 Sheets-Sheet 4
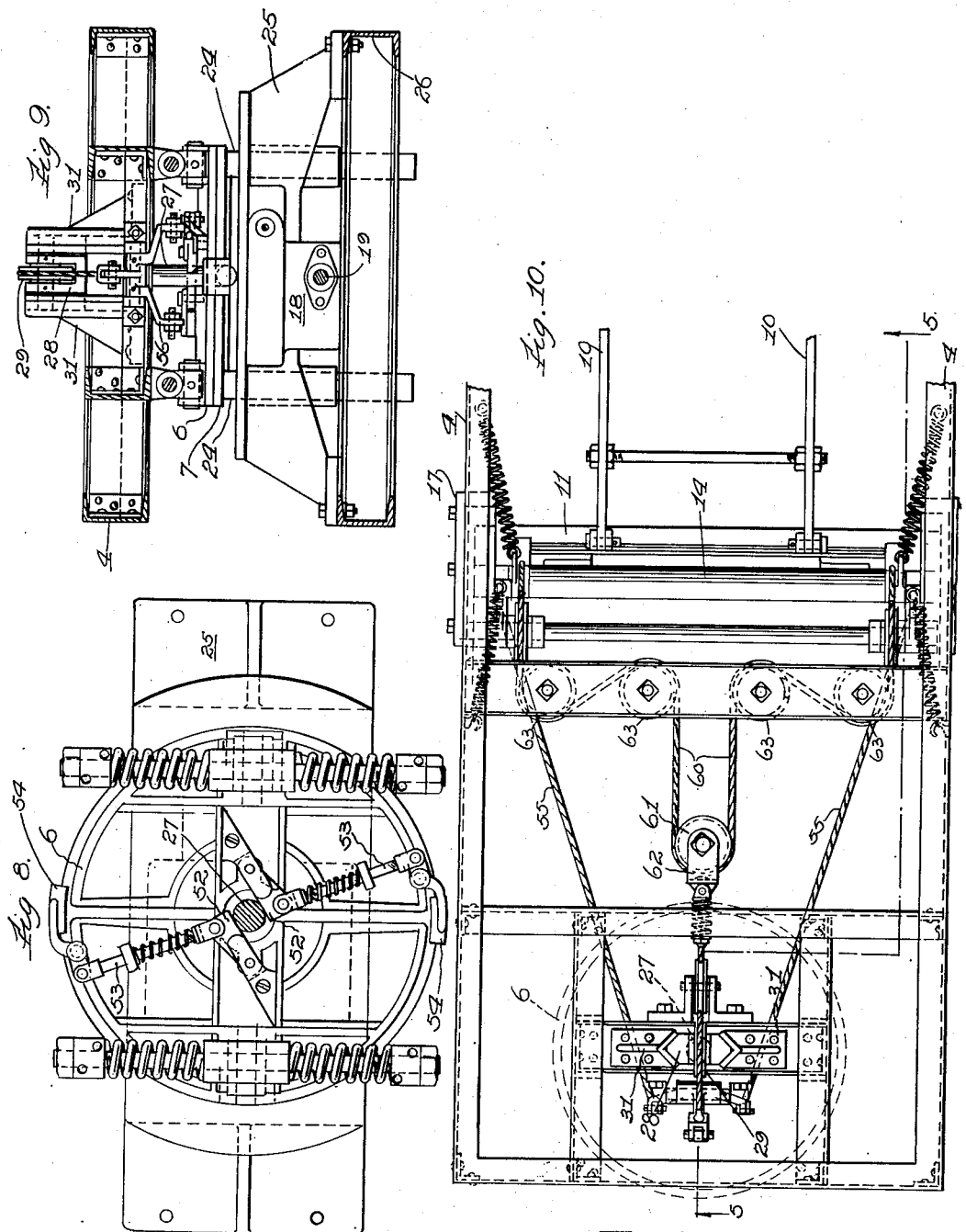

Patented Apr. 2, 1929.

1,707,513

UNITED STATES PATENT OFFICE.

DURREL H. DAVIS, OF EDGERTON, WISCONSIN, ASSIGNOR TO CONTINENTAL AXLE COMPANY, OF EDGERTON, WISCONSIN, A CORPORATION OF WISCONSIN.

FIFTH-WHEEL TRAILER.

Application filed February 20, 1926, Serial No. 89,608. Renewed August 15, 1928.

This invention relates to a tractor trailer construction of which the trailer member is commonly known as a "fifth wheel trailer" or "semi trailer", being partially supported on the tractor by means of a swivel or turntable when the two vehicles are coupled together. The invention is directed to means by which the two vehicles may be coupled or uncoupled by mechanism controlled from the driver's seat on the tractor, and it includes certain features of the auxiliary support for the forward end of the trailer, whereby the support automatically co-operates in the coupling or uncoupling operation. This invention therefore comprises certain features and elements of the construction in the combination herein shown and described, as indicated by the claims.

In the drawings:—

Figure 1 is a side elevation showing conventionally a tractor vehicle and including a semi-trailer attached thereto in accordance with this invention.

Figure 2 is a somewhat diagrammatic top plan view of the same with certain parts broken away to reveal details of the construction.

Figure 3 is a partial side elevation of the trailer showing the lifting means for the fifth wheel in partly upraised position.

Figure 4 is a fragmentary view showing the fifth wheel structure in side elevation with the members of the fifth wheel separated for uncoupling the trailer from the tractor.

Figure 5 is in the nature of a vertical longitudinal section through the trailer, showing the mechanism by which the fifth wheel and the auxiliary support are interconnected.

Figure 6 is a transverse section taken as indicated at line 6—6, on Fig. 5.

Figure 7 is a detail section showing the arrangement of a brake for the wheels of the auxiliary support.

Figure 8 is a top plan view of the fifth wheel structure.

Figure 9 is a vertical section taken as indicated at line, 9—9, on Fig. 5.

Figure 10 is a top plan view of the forward end of the trailer frame with the fifth wheel omitted.

The tractor vehicle shown in Fig. 1 is in the nature of a motor truck of conventional type in which the engine is housed under a hood, 1, and is coupled by suitable gearing to drive wheels, 2; the vehicle is steered and controlled from the driver's seat, 3, and the load is intended to be carried in any suitable form of body to be mounted on a frame, 4, of a trailer vehicle having a rear truck with wheels, 5, while its forward end is supported on the tractor substantially over the drive wheels, 2. The support and draft connection between the tractor and trailer is furnished by a "fifth wheel" comprising an upper member, 6, and lower member, 7, associated for swiveling movement of one upon the other about a vertical axis, the member, 6, being attached to the trailer frame, 4, and the member, 7, being secured to the tractor.

For efficient use of a vehicle of this type it is desirable that the trailer be detachable from the tractor and be provided with auxiliary supporting means for its forward end so that the trailer may be uncoupled and left standing for loading or unloading while the tractor is employed for moving other trailers or doing other work. For this reason the members, 6 and 7, of the fifth wheel are separable and an auxiliary support is provided near the forward end of the frame, 4, and is fitted with ground-engaging wheels, 8, so that when the tractor is uncoupled the trailer may be trundled about on its wheels, 5 and 8, if it should be necessary to move it for short distances in the absence of the tractor. The auxiliary support includes a pair of vertical members, 9, and radius arms, 10, the latter serving to keep the wheels, 8, at a substantially fixed distance from the rear wheels, 5, throughout the range of vertical adjustment of the auxiliary support. The members, 9, are transversely connected at their lower ends by a cross bar, 11, serving as the main portion of the axle for the wheels, 8, and having swiveled sub-axles, 12, carried by yokes, 13, at its ends to provide for steering movement of the wheels, 8. At their upper ends the members, 9, are connected by a tubular member, 14, which may be integral with the vertical parts, 9, and which carries anti-friction rollers, 15, at its ends for guidance in slots or tracks, 16, formed on the inner faces of heavy brackets, 17, which depend from the side members of the frame, 4, near its forward end.

The tractor vehicle carries a special reduction gearing in a housing, 18, located below the fifth wheel, and this reduction gear is arranged to be driven at will through a special shaft, 19, from the engine of the vehicle. A control lever, 20, is indicated adjacent the driver's seat for shifting a special train of gears within a gear box, 21, which are adapted to transmit motion from the engine in either direction to the drive shaft, 19. The reduction gearing is arranged to drive a transverse shaft, 22, having pinions, 23, which mesh respectively with racks, 24, guided for vertical movement in the frame, 25, which is supported on the tractor frame, 26, as a base mounting for the fifth wheel structure. The racks, 24, are attached to and support the lower member, 7, of the fifth wheel so that when the racks are fed upwardly by their pinions, 23, the entire front end of the trailer frame, 4, is elevated through a limited distance. The application of power to the reduction gear within the casing, 18, may be cut off by any form of automatic trip device, not shown, when the racks reach the desired upper limit of travel. This limit is such as to raise the trailer frame high enough to permit of swinging a thrust pin, 27, down from its normal vertically extending position, as shown in Figure 5, to horizontal position, in which it rests on the top of the gear casing, 18, as seen in Fig. 3. The pin, 27, in its vertical position serves to uphold a slidably mounted bracket, 28, for the pulley, 29, over which passes the cable, 30, by which the auxiliary support is held up in its inoperative position, but as the forward end of the trailer frame, 4, is elevated by the racks, 24, the bracket, 28, being slidable in guides, 31, on the trailer frame, moves downwardly in such guides to its lower limit of travel, and is then lifted bodily with the trailer frame off the end of the pin, 27. This lowering of the bracket, 28, and its pulley, 29, in the trailer frame allows the auxiliary support with its wheels, 8, to fall to the lower limit allowed by the guide slots, 16, at which position the detents, 32, are swung to the position indicated in Fig. 3, for locking the auxiliary support in the lower terminal recesses, 33, of the guide slots, 16. The elevated position of the trailer frame, 4, allows the pin, 27, to be swung about its horizontal pivot, 34, downwardly into horizontal position on top of the gear box, 18. Then by suitable adjustment of the gear train within the box, 21, the motion of the pinions, 23, may be reversed for lowering the rack bars, 24, and as the trailer frame is thus lowered, it comes to rest upon the auxiliary supports with the wheels, 8, on the ground, as indicated in dotted lines in Fig. 3.

The rear wheels, 5, of the trailer may be provided with brakes if desired, but simply to prevent the trailer from rolling when it has been detached from the tractor, I provide means for locking the wheels, 8, against rotation, which means may be any form of brakes, 35, shown in Figure 7, as carried within the rim of the wheel, 8. The brake members are fulcrumed at 36, and are adapted to be expanded and forced against the braking surface of the wheel, 8, by the downward movement of a sliding yoke, 37, connected by links, 38, to the brake members, and operating in toggle fashion when depressed by means of the cam, 39, on the rock shaft, 40. The rock shaft is supported in fixed relation to the axle, 11, and is operable at will by hand levers, 41, arranged as shown at each end of the shaft, 40, for access from either side of the trailer. When either of the levers, 41, is depressed the brakes are locked in holding position by means of a dog, 42, and ratchet, 43, the dog being releasable by either of the hand grips, 44, associated with the levers, 41. Each of the brackets, 17, carries a set screw, 45, or equivalent stop device positioned to engage the hand lever, 41, as the auxiliary support is raised to its upper limit, as shown in Figures 1 and 5; this insures that the brakes for the wheels, 8, will be normally set in locked position so that when the auxiliary support is lowered into operative position the brakes will be locked and the wheels, 8, will prevent the trailer from rolling after the tractor has been uncoupled. If it becomes desirable to move the trailer about by hand, the brakes are readily releasable by actuation of the hand grips, 44, and levers, 41.

For shifting the trailer about independently of the tractor, it may be furnished with a detachable tongue, not shown, adapted to be engaged in a tongue socket, 46, which is fulcrumed at 47, on the axle, 11, and is connected to a tie rod, 48, which joins the knuckle arms, 49, by which the wheels, 8, may be steered.

The coupling of the trailer is simply the reverse of the uncoupling operation. As the trailer stands supported on the auxiliary wheels, 8, the tractor is backed under the forward end of the trailer frame, 4, to bring the fifth wheel sections, 6 and 7 in approximate registration, as in Figure 4. Power is then applied through the gear box, 21, and reduction gear at 18, to raise the racks, 24, and elevate the lower swivel member, 7, into engagement with the upper member, 6. The conical center portion, 7a, engaging a corresponding recess, 6a, in the upper member perfects the registration of the swivel parts, whereupon the weight of the trailer is assumed by the fifth wheel, and the latter is elevated still farther to provide sufficient clearance for raising the thrust pin, 27, to vertical position by means of the hand lever, 50, and its connecting rod, 51.

Now by reversing the movement of the racks, 24, by means of the gear shift lever, 20, the entire fifth wheel assembly and with it the frame, 4, of the trailer is lowered. The thrust pin, 27, is forced between the jaws, 52, fulcrumed on the upper member, 6, of the fifth wheel, and as these jaws are spread apart, their motion is transmitted through links, 53, to the swinging clamps, 54, fulcrumed at the rim of the member, 6, and formed to engage under the rim of the part, 7; thus the halves of the fifth wheel are locked together to guard against their possible separation in travel of the vehicle over a rough road.

As the parts move downward the thrust pin, 27, engaging the bracket, 28, pushes it upward in its guides, 31, tensioning the cable, 30, and likewise the cable, 55, which is connected to the cable, 30, through a bell crank, 56, and extends for attachment to the detents, 32. Therefore, the first result of the cable tension is to withdraw the detents, 32, from engagement with the cross member, 14, of the auxiliary support, so that as the bracket, 28, continues to be pushed upward by the cross pin, 27, the cable, 30, may operate to raise the auxiliary support in the guide slots, 16, to the upper limit at which the rollers, 15, are lodged in pockets, 57, which form the upper terminals of the slots, 16. In this position the weight of the auxiliary support is almost entirely carried on the lower walls of the pockets, 57, so that the cables are not under any heavy tension though they are stressed in opposition to springs, 58, hooked to the frame at 59, and serving to initiate the movement of the rollers, 15, into the vertical portions of the slots, 16, when the support is again lowered into operative position.

It will be seen that since the cable, 30, extends downwardly at both sides of the pulley, 29, the upward travel of the bracket, 28, produces substantially twice its own movement in the cable, 30, and this is transmitted without substantial alteration to the auxiliary support so as to provide an ample range of vertical adjustment of the support to insure that the wheels, 8, shall be carried at a safe distance above the road surface when the trailer is coupled to the tractor. The connection between the cable, 30, and the cross member, 14, of the support is made by a double cable, 60, passing over an equalizer pulley, 61, in a clevice, 62, on the end of the cable, 30, and extending around guide pulleys, 63, 63, 63, on the trailer frame.

When the fifth wheel has been let down to its lower limit by the racks, 24, the bracket, 28, will be held at its upper limit as shown in Figures 1 and 5, and will remain in this position for upholding the auxiliary support as long as the tractor and trailer remain coupled together.

Thus it will be seen that I have provided a comparatively simple mechanism by which the tractor and trailer may be coupled or uncoupled at will by means controllable by the driver of the tractor from his driving seat. The elevation and lowering of the trailer frame is accomplished without relative longitudinal motion of the two vehicles; hence the success of the operation does not depend upon the holding power of the trailer brakes and does not require blocking the trailer. Furthermore, the coupling and uncoupling may be accomplished whether the two vehicles are longitudinally aligned or stand at an angle to each other, since it merely involves the vertical registration of circular parts, namely, the two members of the fifth wheel and the cylindrical thrust pin, 27; this is a distinct advantage in close quarters where it is desirable to back the trailer against a loading platform and swing the tractor at right angles to it to avoid blocking traffic.

I claim:—

1. In the combination of a tractor and a semi-trailer a fifth wheel device by which they are coupled together comprising a two-part swivel, one part being permanently attached to the trailer and the other part being mounted on the tractor, an auxiliary support for the end of the trailer adjacent the fifth wheel having ground-engaging means normally carried in an elevated position but adjustable downwardly for supporting the forward end of the trailer together with means operable wholly from the driver's seat on the tractor for coupling or uncoupling the tractor and trailer and adjusting the auxiliary support vertically without longitudinal movement of either vehicle.

2. In the combination of a tractor and a semi-trailer, a fifth wheel comprising a two-part swivel, one part being permanently attached to the trailer, and means by which the other part is mounted for vertical adjustment on the tractor; an auxiliary support for the end of the trailer adjacent the fifth wheel, having ground-engaging means normally carried in elevated position, and mechanism associated with the fifth wheel, whereby said support is lowered into operative position when the fifth wheel is raised on the tractor.

3. In the combination defined in claim 2, said support being movable by gravity into operative position and automatic detent means for retaining the support at the lower limit of its range.

4. In a semi-trailer, a truck supporting one end thereof and an auxiliary support for the other end adjustable up and down under the trailer, a vertically extending guide track secured to the trailer frame and engaging the upper portion of the support throughout its vertical movement, the lower end of said guide track comprising a horizontally offset portion by which a part of the load is transmitted to the support.

5. The method of coupling a tractor and a semi-trailer which consists in supporting the trailer temporarily with its forward end in a plane higher than the tractor frame, moving the tractor frame under the forward end of the trailer frame, elevating a coupling device on the tractor into engagement with the trailer and then enough higher to assume the weight thereof, then lowering the coupling device and utilizing the downward travel of the trailer frame with respect to the tractor for shifting the temporary support out of operative position.

6. The method of coupling the tractor and a semi-trailer which consists in providing an auxiliary support for the trailer to uphold its forward end independently of the tractor in a plane higher than the tractor frame, moving the tractor frame under the forward end of the trailer frame, elevating a coupling device on the tractor into engagement with the trailer and then enough higher to assume the weight thereof, and finally lowering the coupling device and utilizing the downward travel of the trailer frame with respect to the tractor through multiplying linkage for raising the auxiliary support through a greater distance than said tractor and out of operative position.

7. In the combination of a tractor and a semi-trailer, a fifth wheel comprising a two-part swivel, one part being permanently attached to the trailer, and means by which the other part is mounted for vertical adjustment on the tractor, retaining means for locking said swivel parts together automatically releasable by the elevation of the fifth wheel on the tractor.

8. In the combination of a tractor and a semi-trailer, a fifth wheel comprising a two-part swivel, one part being permanently attached to the trailer, and means by which the other part is mounted for vertical adjustment on the tractor; an auxiliary support for the end of the trailer adjacent the fifth wheel, having ground-engaging means adjustable up and down under the trailer, and adapted at its lower limit to hold the trailer with its fifth wheel member in a position higher than it assumes at the lower limit of adjustment of the fifth wheel on the tractor, said support being movable automatically to such lower limit when the fifth wheel is elevated on the tractor, whereby the lower member of the fifth wheel may be lowered on the tractor and thus separated from the upper member for uncoupling the tractor from the trailer.

9. In a semi-trailer, a truck supporting one end thereof, an auxiliary support for the other end including ground-engaging wheels adjustable up and down under the trailer, brakes for said wheels and means for automatically setting said brakes when the wheels are moved to their upper limit.

10. In the combination defined in claim 9, manual means for releasing the brakes when the wheels are adjusted in ground-engaging position.

11. In a semi-trailer, a truck supporting one end thereof, an auxiliary support for the other end including ground-engaging wheels adjustable up and down under the trailer, brakes for said wheels with a brake lever fulcrumed on the auxiliary support, and means on the trailer frame positioned to contact with said brake lever, and set the brakes when the wheels of the support are lifted off the ground.

12. In the combination of a tractor and a semi-trailer, a fifth wheel serving to couple the two vehicles together and having separable parts to permit uncoupling them, an auxiliary support for the end of the trailer adjacent said fifth wheel, having ground-engaging wheels adjustable up and down under the trailer, means for shifting said wheels to their upper limit when the vehicles are coupled together, and means for lowering said wheels to support the trailer when the vehicles are uncoupled, together with brakes for said ground-engaging wheels of the support, with means automatically setting said brakes when the support is raised to its upper limit, said brakes being adapted to remain set when the support is lowered for ground engagement.

13. In the combination of a tractor and a semi-trailer, a fifth wheel comprising a two-part swivel, one part being permanently attached to the trailer and centrally apertured, means by which the other part is mounted for vertical adjustment on the tractor, a thrust pin movably mounted on the tractor for projection through the aperture of the trailer swivel member, a vertically movable bracket on the trailer supporting a pulley and registering with the aperture for engagement by said pin, whereby the raising or lowering of the fifth wheel causes vertical movement of the bracket with respect to the trailer frame; an auxiliary support for the end of the trailer adjacent the fifth wheel having ground-engaging means normally carried in elevated position with a cable extending over the said pulley and connected for holding said support in elevated position, whereby the upward movement of the fifth wheel and the trailer frame with respect to the thrust pin and the pulley bracket relaxes the cable for lowering the support into ground-engaging position.

14. In the combination defined in claim 13, means for shifting the thrust pin from its upwardly-projecting position to avoid engagement of the pin with said bracket when the fifth wheel is lowered from elevated position, and means for retaining the support in ground-engaging position to sustain the trailer independently of the tractor.

15. In the combination defined in claim 13, means for shifting the thrust pin to avoid registration thereof with the bracket, automatic detent means for retaining the support in its lowered position for assuming the trailer load as the fifth wheel is lowered, and means connecting said detent with the bracket, whereby when the thrust pin is returned to up-standing position the initial upward movement of the bracket and its pulley releases the detent for permitting return of the support to elevated position.

16. In the combination defined in claim 13, one end of the cable being substantially anchored to the trailer frame, while the other end is connected to the vertically movable support, the cable extending downwardly on both sides of the said pulley, whereby the travel of the pulley and its bracket is multiplied for moving the support through a greater vertical distance than the range of movement of the fifth wheel on the tractor.

17. In the combination of a track and a semi-trailer, a fifth wheel comprising a two-part swivel, one part being permanently attached to the trailer, means by which the other part is mounted for vertical adjustment on the tractor, a thrust pin mounted on the tractor and adapted to project vertically through a central aperture in the trailer-carried-part of the swivel, whereby vertical movement of the fifth wheel on the tractor raises or lowers the trailer frame with respect to the end of the pin, an auxiliary support for the end of the trailer adjacent the fifth wheel, having ground-engaging means normally carried in elevated position, and linkage on the trailer frame operable by said relative movement of the frame and the thrust pin for lowering and raising said auxiliary support.

18. In the combination defined in claim 17, detent means for locking the support in ground-engaging position, said linkage including a connection with said detent means for releasing it in the initial part of the movement by which the support is raised.

19. In a semi-trailer, a truck supporting one end thereof and an auxiliary support for the other end adjustable up and down under the trailer, a vertically extending guide track secured to the trailer frame and engaging the upper portion of said support throughout its up-and-down movement, said guide track terminating in a horizontally offset pocket at its upper end and a cable attached to the upper end portion of the support and extending horizontally over suitable guiding means adjacent said pocket for raising and lowering the support, whereby a horizontal wall of the pocket principally sustains the weight of the support when the latter is carried in elevated position.

20. In the combination defined in claim 17, said thrust pin being mounted on a horizontal pivot for folding downwardly on the tractor to permit the trailer frame to be lowered without raising the auxiliary support, and automatic detent means which retains said support in ground-engaging position when the trailer frame is lowered with said pin folded down.

21. In the combination of a tractor and a semi-trailer, a fifth wheel comprising a two-part swivel, one part being permanently attached to the trailer, and means by which the other part is mounted for vertical adjustment on the tractor, retaining means for holding the swivel parts together, a movable member normally projecting upward from the tractor and serving to hold said retaining means in operative position, the fifth wheel being adjustable on the tractor to a height at which said member no longer cooperates with the retaining means, means for releasing said retaining means at such position of the fifth wheel and means for shifting said projecting member out of operative position to permit lowering the tractor-carried member of the swivel for separating the swivel parts to uncouple the tractor from the trailer.

22. In the combination of a tractor and a semi-trailer, a fifth wheel device by which they are coupled together, comprising a two-part swivel, one part being permanently attached to the trailer and the other part being mounted on the tractor, means controllable from the driver's seat on the tractor for raising and lowering said fifth wheel device at will, an auxiliary support for the end of the trailer adjacent the fifth wheel having ground-engaging means normally carried in elevated position, mechanism associated with the fifth wheel, whereby said support is lowered automatically into operating position when the fifth wheel is raised on the tractor, and means for shifting said mechanism from the driver's seat to avoid raising the auxiliary support when the fifth wheel is next lowered, whereby said lowering of the fifth wheel separates the tractor-carried part from the trailer-attached part for uncoupling the vehicles.

23. In the combination of a tractor and a semi-trailer, a coupling device comprising one part permanently attached to the trailer and another part mounted on the tractor, an auxiliary support for the end of the trailer adjacent the fifth wheel having ground-engaging means normally carried in an elevated position but adjustable downwardly for supporting the forward end of the trailer together with means controllable wholly from the driver's seat on the tractor for coupling or uncoupling said parts and adjusting the auxiliary support vertically without longitudinal movement of either vehicle.

24. In the combination of a tractor and a semi-trailer, a coupling device comprising one part permanently attached to the trailer, and means by which the other part is mounted for vertical adjustment on the tractor capable of elevating the trailer with respect to the tractor, an auxiliary support for the trailer, and mechanism associated with the coupling device adapted to lower said support into operative position when the trailer is elevated, to permit disengagement of the coupling means by lowering the tractor-carried part.

DURREL H. DAVIS.